Feb. 17, 1925.
W. R. McGOWEN
1,526,355
VEHICLE BUMPER
Filed July 30, 1924
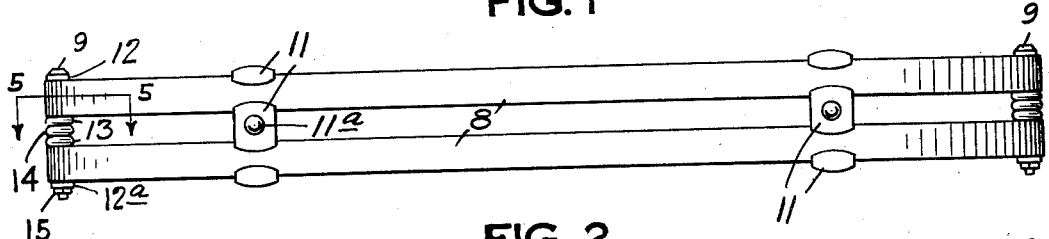
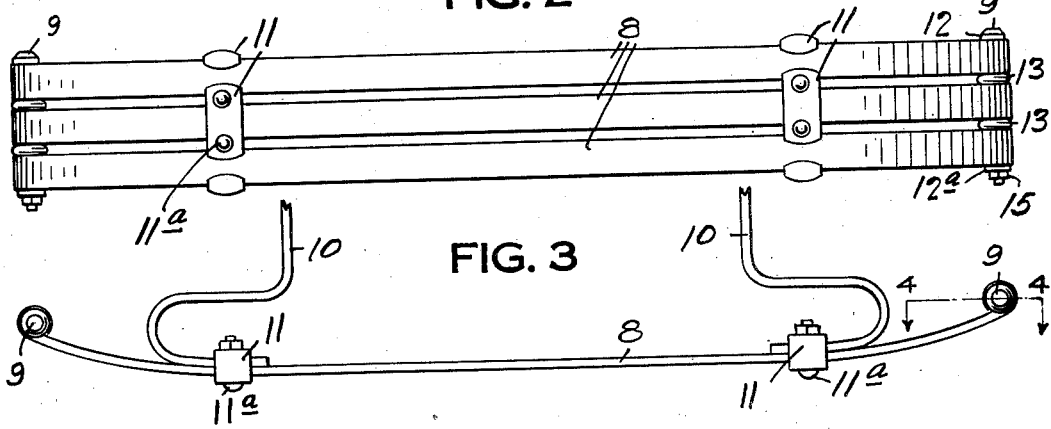
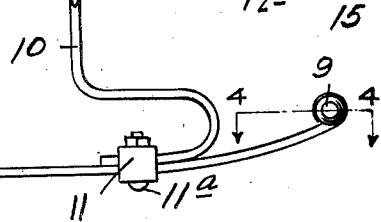
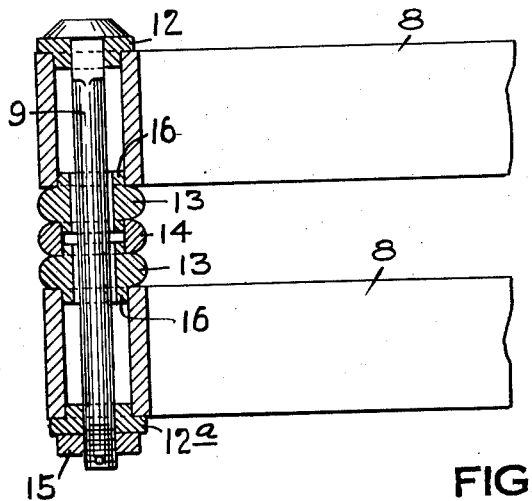
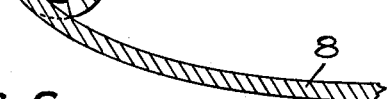
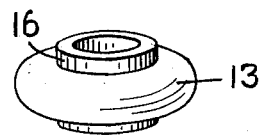
INVENTOR
William R. McGowen
By Kay, Totten & Martin,
Attorneys.

Patented Feb. 17, 1925.

1,526,355

UNITED STATES PATENT OFFICE.

WILLIAM R. McGOWEN, OF CHICAGO, ILLINOIS.

VEHICLE BUMPER.

Application filed July 30, 1924. Serial No. 729,120.

*To all whom it may concern:*

Be it known that I, WILLIAM R. McGOWEN, a citizen of the United States, and a resident of Chicago, in the county of Cook and State of Illinois, have invented a new and useful Improvement in Vehicle Bumpers; and I do hereby declare the following to be a full, clear, and exact description thereof.

My invention relates to vehicle bumpers and particularly to those embodying a plurality of bumper bars with which spacer rings are employed.

My invention is particularly applicable to bumpers comprising a plurality of bars which are maintained in assembled relation by tie-bolts, and has for its object the provision of improved forms of spacer rings surrounding the tie-bolts, the bars and the spacer rings being of such form that the tie-bolts are relieved of bending strains at points intermediate their ends. The device also includes interchangeable features whereby the number of bars may be varied at will.

Some of the forms which my invention may take are shown in the accompanying drawing wherein Fig. 1 is a view, in front elevation, of a bumper embodying my invention; Fig. 2 is a similar view of a modified form of bumper; Fig. 3 is a plan view of the bumpers of Figs. 1 and 2; Fig. 4 is a sectional view taken on the line 4—4 of Fig. 3; Fig. 5 is a view taken on the line 5—5 of Fig. 1, and Figs. 6 and 7 are views, on an enlarged scale, of the spacer rings which I employ.

Referring to Figs. 1 and 3, the bumper structure includes vertically spaced parallel bars 8 held together by tie-bolts 9. Two bracket members 10 are provided, only a portion thereof being shown, that are secured to the bars 8 through clamp members 11 and bolts 11ᵃ of any suitable form. The brackets 10 may be attached to the vehicle in any desired manner.

The ends of the bars 8 are in the form of eyes that are of much greater interior diameter than the thickness of the bolts 9, as appears clearly in Fig. 4. In assembling the structure, a shouldered washer 12 is first placed on the bolt 9; a bar 8 is then moved up into position against the washer 12; a shouldered spacer ring 13 is then moved into place, followed by a plain spacer ring 14 which is moved into position against ring 13, after which a duplicate of the ring 13 is brought into position against the under side of the ring 14. Another bar 8 is then placed in position. Thereafter a ring 12ᵃ which may be a duplicate of the ring 12 is placed in position and a nut 15 applied to the bolt to hold the above named parts thereon.

The rings 12 and 12ᵃ have close fitting engagement with the body portion of the bolt 9 and with the eye portions of the bars 8 so that rattling is avoided. The rings 13, however, fit the bolt 9 loosely so that they may have movement transversely thereof, but the shouldered portions 16 of the rings 13 fit the eyes of the bars 18 snugly. If desired, but one ring 13 need be placed between the adjacent bars 8, the rings 14 in such case being dispensed with and the flanged portions 16 at the upper and lower sides of the rings 13 each fitting into one of the bars 8. However, where two or more rings 13 are employed between a pair of bars 8, splice rings 14 must be employed as shown in Fig. 4.

It will be seen that by varying the number of rings 13, practically the same parts may be used to construct either a two-bar or a three-bar bumper and that the spacing between bars may be changed at will.

Another, and important, feature of my invention resides in the provision of clearance between the rings 13 and the body of the bolt 9 and the provision of flanges 16 that engage the bars 8. This arrangement relieves the bolts of bending strains when impacts are imparted to the bumper at its ends, by reason of the fact that the force is not transmitted to the body of the bolt intermediate its ends but is taken up directly by the rings 13 and the bars 8. In the structure shown in Fig. 4, the forces may be transmitted from one ring 13 to another ring 13, through the medium of the splice ring 14. In other words, whether the rings 13 and 14 come directly in contact with an extraneous object or whether the ends of the bar are engaged, bending strains are not imparted to the bolt 9 at its midportion, it being only necessary that the bolt acts merely as a tie-member for holding the other parts in vertically assembled relation.

While spacer rings have heretofore been employed between bumper bars such rings have served merely as spacers and not as impact receiving and transmitting members. Various changes in detail and general arrangement may be made without departing from the spirit and scope of the invention as defined in the accompanying claims.

What I claim is:

1. A bumper structure comprising a plurality of bumper bars each provided with an eye portion at each end, a tie-bolt of relatively small diameter extending through the eye portions at each end of said bars, a spacer ring loosely surrounding said bolt and disposed between said bars, and flanges upon opposite sides of said ring, each of said flanges having close fitting engagement with said eye portions.

2. A bumper structure comprising a plurality of bumper bars each provided with an eye portion at each end, a tie-bolt of relatively small diameter extending through the eye portions at each end of said bars, a spacer ring loosely surrounding said bolt and disposed adjacent to one of said bars, a shoulder on said ring having close fitting engagement with said last-named bar, a shoulder on the opposite side of said ring, a splice ring closely fitting said second-named shoulder, and a second ring having a shouldered portion at its opposite side fitting the eye portion of another bar.

3. A vehicle bumper comprising a plurality of vertically spaced parallel bars, a tie-bolt engaging said bars, and connecting members disposed between the said bars, clearance being provided between said bars and said bolts intermediate the ends of the bolts.

4. A vehicle bumper comprising a plurality of vertically spaced parallel bars, a tie-bolt engaging said bars, clearance being provided between said bars and said bolts intermediate the ends of the bolts, spacer and impact transmitting members loosely surrounding said bolts at points between adjacent bars and having abutting engagement with said bars at points radially of said bolts.

5. A vehicle bumper comprising a plurality of vertically spaced parallel bars, a tie-bolt for maintaining such bars in vertical alignment, and means for relieving the midportion of said bolt of stresses imparted to said bars in a direction transversely of the bolt.

6. A vehicle bumper comprising a plurality of vertically spaced parallel bars, a tie-bolt for maintaining such bars in vertical alignment, and means for relieving said bolt of stresses imparted to said bars in a direction transversely of the bolt, the said means serving also as a means for spacing said bars.

7. A vehicle bumper comprising an impact-receiving structure having eye portions adjacent to its ends, a tie-bolt of relatively small diameter extending through each of the eye portions, means adjacent to each end of the bolt for supporting said impact structure, and means for maintaining an annular space between the mid-portion of the bolt and the adjacent portions of the impact structure.

8. The combination with an impact-receiving structure, of a bolt provided with means adjacent to each end thereof for engaging the said structure, and means for providing clearance space between the mid-portion of the bolt and said structure, to relieve said mid-portion of strains imparted radially thereto.

In testimony whereof I, the said WILLIAM R. McGOWEN, have hereunto set my hand.

WILLIAM R. McGOWEN.